No. 755,000. PATENTED MAR. 22, 1904.
C. C. HEDBERG.
VALVE DEVICE.
APPLICATION FILED JULY 7, 1903.
NO MODEL.
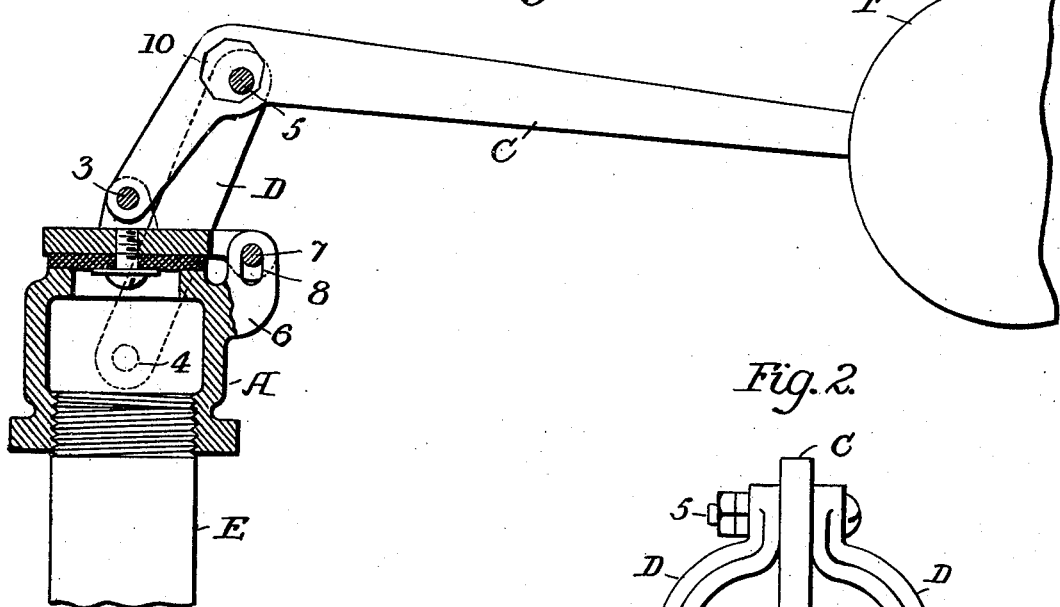
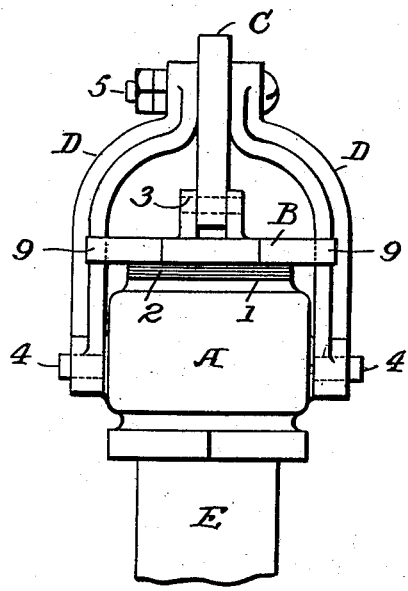
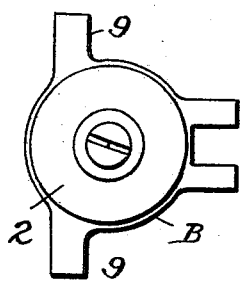
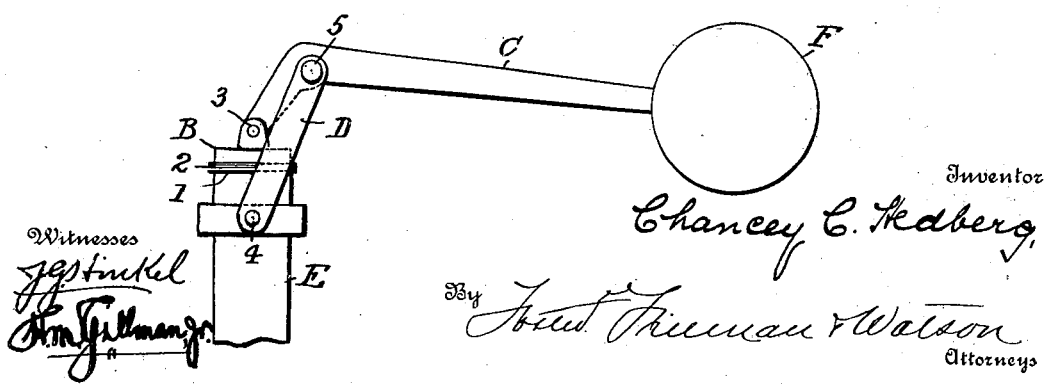
Inventor
Chancey C. Hedberg
By Fred Trueman & Watson
Attorneys
Witnesses No. 755,000. Patented March 22, 1904.

UNITED STATES PATENT OFFICE.

CHANCEY C. HEDBERG, OF DES MOINES, IOWA.

VALVE DEVICE.

SPECIFICATION forming part of Letters Patent No. 755,000, dated March 22, 1904.

Application filed July 7, 1903. Serial No. 164,598. (No model.)

*To all whom it may concern:*

Be it known that I, CHANCEY C. HEDBERG, a citizen of the United States, residing at Des Moines, in the county of Polk and State of Iowa, have invented certain new and useful Improvements in Valve Devices, of which the following is a specification.

My invention relates to valves for closing against pressure; and it consists of a valve device more especially adapted for use in connection with floats controlling the position of the valve, the parts being constructed to secure the desired movements of the valve without the use of guides or slides and the friction incident thereto and whereby to close and hold the valve against any required pressure, while permitting it to be freely and fully opened, as fully set forth hereinafter and as illustrated in the accompanying drawings, in which—

Figure 1 is a sectional elevation of a tank-valve device embodying my improvement. Fig. 2 is an edge view; Fig. 3, a plan of the valve and its packing; Fig. 4, a view illustrating a modification.

The casing A may be constructed so as to be attached to a supply-pipe E, as in Figs. 1 and 2, or it may constitute the end of the said pipe, as in Fig. 4, so as in either case to afford an annular seat 1, against which closes a valve B, the latter preferably carrying a packing 2. The valve B is connected to and practically supported by a bell-crank lever C, the end of the short arm of which is pivoted between ears on the valve by a cross-pin 3. The lever is supported by means of links D D, each pivoted at its lower end to a pin 4 at the side of the casing and connected at its upper end to the lever C by a pin 5, and the pins 3 4 5 are so arranged that when the valve is closed they will be very nearly in line with each other vertically, so that the valve will not be forced from its seat by any pressure which is likely to exist within the pipe E. A slight downward movement of the outer end of the lever C, however, will carry the upper pin 5 out of line, lift the pin 3 and the valve, and open the outlet from the casing. These parts may be combined in any device where it is necessary to control the port of the casing to hold the valve or close it against pressure from within said casing; but in the construction illustrated the parts are arranged and adapted for use in connection with a float F, so that when the parts are arranged within a water-tank a height of water sufficient to lift the float to a predetermined point will close the valve, while a reduction in the height will cause the valve to be opened, and a comparatively short lever C will secure a sufficient pressure through the medium of the toggles to hold the valve against the pressure.

The valve may be carried directly by the end of the short arm of the bell-crank lever, as shown in Fig. 4, or it may be in part supported by hinging or pivoting it to an arm 6 at one side of the seat, and in order that it may at all times be brought parallel to the seat on closing the pivot-pin 7 may extend into an elongated slot 8 in the arm 6, thereby allowing sufficient play to secure the desired result, the valve being supported by the lever C on opening, but swinging on its pin 7 as it is closed.

In order to prevent the pivot-pin 5 from being carried across the plane including the pins 3 and 4, I provide the valve with lugs 9 9, extending from the sides of the valve in position to engage and limit the movements of the links D.

When a packing is used, it is apt to become compressed in time, which would result in leakage past the valve when the latter is closed, and to permit adjustment that will compensate for this compression I secure the pin 5 eccentrically in an angular block or stud 10, adapted to a corresponding angular socket in the lever. This permits the stud to be removed, turned a partial revolution, and inserted again in the socket, changing the position of the pin, and dispenses with means for clamping or holding the stud after adjustment.

Without limiting myself to the construction shown, I claim—

1. The combination with the casing having a valve-seat, of a valve fitted to said seat, hung to a pivot at one side of the seat and pivoted to the end of a bell-crank lever, and swinging links supporting said lever, substantially as set forth.

2. The combination of the casing having a valve-seat at the end, and an arm at one side, a valve adapted to said seat and hung to said arm, a bell-crank lever having a short arm pivoted at the end to said valve and a long arm connected to a float, and links pivoted to the sides of the casing and to the lever, substantially as set forth.

3. The combination with valve, lever and connecting-links, of a pivot-pin for the links, an angular stud in which the pin is placed eccentrically and a socket for the stud in the lever, substantially as set forth.

4. The combination with a socketed lever, of an angular stud fitted to said socket, and an eccentric pivot-pin carried by said stud, substantially as set forth.

5. The combination with the casing having a valve-seat, of a valve fitted to said seat, hung to a pivot at one side of the seat and pivoted to the end of a bell-crank lever, swinging links supporting said lever, and lugs 9, 9 arranged on the casing to limit the swinging of the links in one direction, substantially as set forth.

In testimony whereof I have signed my name to this specification in the presence of two subscribing witnesses.

CHANCEY C. HEDBERG.

Witnesses:
O. G. MOEN,
FRITZ B. HEIZE.